June 13, 1950
J. KRAL
2,511,805
ONE PIECE FASTENER CLIP FOR USE WITH
AN APERTURED SUPPORT
Filed Sept. 16, 1947
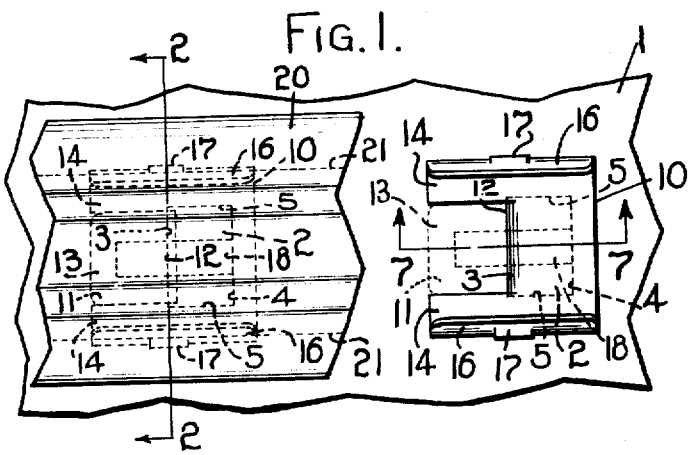
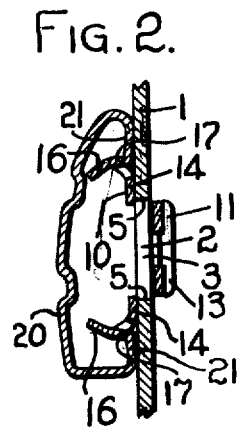
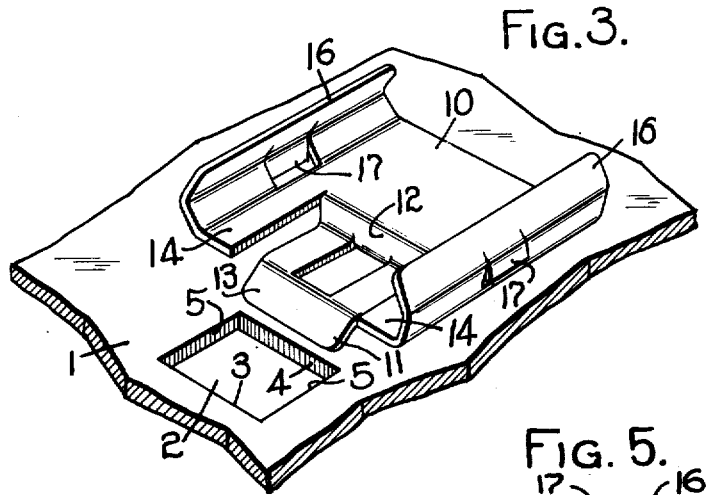
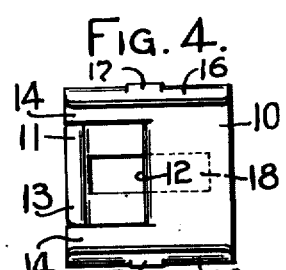
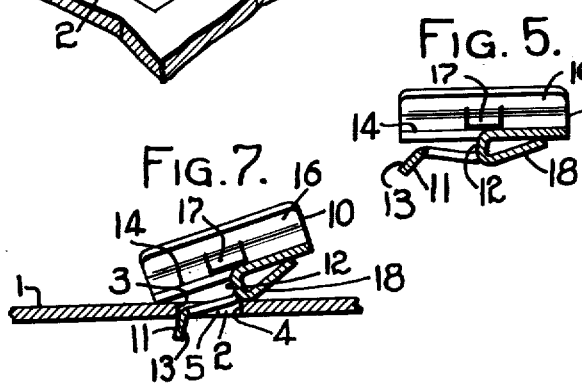
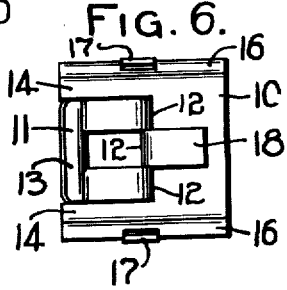
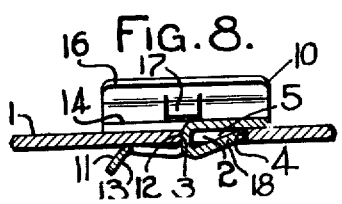
INVENTOR.
JOSEPH KRAL:
BY Philip E. Parker
ATTORNEY Patented June 13, 1950

2,511,805

UNITED STATES PATENT OFFICE 2,511,805

ONE-PIECE FASTENER CLIP FOR USE WITH AN APERTURED SUPPORT

Joseph Kral, Cambridge, Mass., assignor to United-Carr Fastener Corporation, Cambridge, Mass., a corporation of Massachusetts Application September 16, 1947, Serial No. 774,365

1 Claim. (Cl. 24—259)

The present invention relates to fasteners and more particularly to fasteners for securing moldings and the like to an apertured support, and aims generally to improve existing fasteners of that type.

A primary object of the invention is the provision of a one-piece molding fastener having an integral locking tongue adapted to be inserted in a pre-shaped opening in a supporting member and locked thereto, the fastener having integral molding flange engaging means adapted to be snap-locked to opposed flanges of a molding positioned thereon.

Other aims and objects of the invention will be apparent to persons skilled in the art to which the invention relates, from a consideration of the accompanying drawings and annexed specification, illustrating and describing a preferred construction embodying the invention.

In the drawings—

Fig. 1 is a top plan view of a molding-secured installation, part of the molding being broken away to illustrate the fastener attached to a support;

Fig. 2 is a transverse sectional view as taken on the line 2—2 of Fig. 1;

Fig. 3 is a perspective view illustrating the fastener ready to be inserted in an aperture of a support;

Fig. 4 is a top plan view of a fastener embodying the invention;

Fig. 5 is a side elevation thereof;

Fig. 6 is a bottom plan view of the fastener shown in Figs. 4 and 5;

Fig. 7 is a sectional view as taken on the line 7—7 of Fig. 1, and illustrating the manner of inserting the fastener in the support; and Fig. 8 is a sectional view similar to Fig. 7 and illustrating the fastener in its applied position on the support.

Referring to the drawings, the improved fastener is preferably made of a single piece of sheet material, for example metal, having a body plate portion provided with molding fastener elements and an attaching tongue adapted to be slid in an aperture of a support and secured thereto.

The support 1 may be any suitable structure, herein illustrated as a sheet metal panel provided with a series of rectangular apertures 2 having opposed sides 3 and 4, and edges 5.

The fastener of the invention preferably comprises a sheet metal plate body portion 10 having an attaching tongue 11 cut from one side of the plate, said tongue being disposed in a plane below the plane of the body portion 10 and connected thereto by offset 12. The free end of the tongue 11 is preferably down-turned as at 13 to facilitate sliding under the panel 1.

The plate body 10 is, in the form shown, substantially C-shaped, and has arms 14 on opposite sides of the tongue 11, which arms are disposed in the plane of the body portion 10 and hence above the plane of the tongue so as to bear on the outer face of the support 1. These arms 14 and body portion 10 have, along their outer edges, molding fastener means preferably in the form of outwardly and inwardly curved edges 16. The outer walls of said edges are provided with downwardly extending tongues 17 slit therefrom and presenting lugs having terminal ends spaced from the support-engaging face of the body 11 and disposed laterally beyond the outer surfaces of the molding fastener edges 16.

The fastener member, above described, is attached to the support by inserting the tongue 11 in the support opening 2 and sliding the fastener laterally until the offset 12 engages the edge 3 of the support opening 2. In this position the support 1 is gripped on opposite sides by the tongue 11 and arms 14 of the body portion. The fastener member may be locked in this position by means of a lug 18 cut from the metal of the tongue 11 and bent at the offset 12 rearwardly to engage the side edge 4 of the support aperture 2.

The molding 20 may be of any usual type construction and shape and usually comprises a channel-shaped member having inwardly directed flanges 21 along its base side.

In use a plurality of fasteners are attached in longitudinal series to the support 1 in the manner above described. A molding is then placed over said fasteners, and pressed toward the support, the resilience of the molding permitting slight expansion of the flanges to enable them to be snapped over the fastener edges 16 and locked under the terminal ends of the tongues 17, thus tightly clamping the molding flanges between the tongues 17 and the support 1.

It will be seen that the construction is simple and may be quickly and easily applied in molding-secured installations.

While I have illustrated and described a preferred construction embodying the invention, I do not intend to be restricted thereto as the scope of the invention is best defined in the appended claim.

I claim:

A molding fastener formed of a single piece of sheet metal comprising a flat base portion with a slot extending from one end edge of said base portion to substantially the center of said base portion, the side edges of said slot being substantially parallel to the side edges of said base portion and the base of said slot being substantially parallel to said one end edge of said base portion, a tongue extending from the base of said slot integral with said base portion and having a connecting portion adjacent to and substantially normal to said base portion and also having a support-engaging portion extending from said connecting portion and disposed substantially parallel to, but spaced from said base portion, said support-engaging portion of said tongue having an aperture with an edge adjoining said connecting portion, a stop member integrally connected with said tongue where the connecting portion joins the support-engaging portion, said stop member extending angularly toward said base portion from said connecting portion in a direction opposite said support-engaging portion, said stop member, at its end opposite said tongue, and said connecting portion providing opposed surfaces for engaging opposite walls of an aperture in a support whereby the clip is firmly held in the support, said tongue and said base portion providing surfaces for engaging opposite faces of such a support adjacent the aperture therein, and molding-engaging arcuate resilient flanges extending from said side edges of said base portion on opposite sides of said tongue and stop members and disposed substantially normal to the face of said base portion opposite said tongue.

JOSEPH KRAL.

REFERENCES CITED

The following references are of record in the file of this patent:

UNITED STATES PATENTS

| Number | Name | Date |
| --- | --- | --- |
| 2,133,837 | Wiley | Oct. 18, 1938 |
| 2,144,171 | Van Uum | Jan. 17, 1939 |
| 2,168,721 | Tinnerman | Aug. 8, 1939 |
| 2,200,047 | Tinnerman | May 7, 1940 |